United States Patent
Steber et al.

(10) Patent No.: US 10,189,326 B2
(45) Date of Patent: Jan. 29, 2019

(54) ASSEMBLY COMPRISING A FRAME ELEMENT AND A CONNECTING ELEMENT, AND METHOD FOR SECURING A CONNECTING ELEMENT TO A FRAME ELEMENT

(71) Applicant: Bayerische Motoren Werke Aktiengesellschaft, Munich (DE)

(72) Inventors: Gerhard Steber, Munich (DE); David Keller, Munich (DE); Juergen Kempf, Munich (DE); Christian Marmodee, Munich (DE); Olaf Kolk, Allershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 215 days.

(21) Appl. No.: 15/178,681

(22) Filed: Jun. 10, 2016

(65) Prior Publication Data

US 2016/0280025 A1 Sep. 29, 2016

Related U.S. Application Data

(63) Continuation of application No. PCT/EP2014/076256, filed on Dec. 2, 2014.

(30) Foreign Application Priority Data

Dec. 13, 2013 (DE) .................. 10 2013 225 905

(51) Int. Cl.
*B60G 7/02* (2006.01)
*B62D 21/11* (2006.01)
(Continued)

(52) U.S. Cl.
CPC ............ *B60G 7/02* (2013.01); *B29C 66/1222* (2013.01); *B29C 66/1226* (2013.01);
(Continued)

(58) Field of Classification Search
CPC ... B60G 7/02; B29C 66/1222; B29C 66/1226; B29C 66/12821; B29C 66/1284;
(Continued)

(56) References Cited

U.S. PATENT DOCUMENTS 3,139,275 A 6/1964 Burkitt
5,944,441 A 8/1999 Schuetze
(Continued)

FOREIGN PATENT DOCUMENTS

CN 1579822 A 2/2005
CN 102149549 A 8/2011
(Continued)

OTHER PUBLICATIONS

Chinese-language Office Action issued in counterpart Chinese Application No. 201480057400.4 dated Nov. 3, 2017 with English translation (12 pages).

(Continued)

*Primary Examiner* — Joseph D. Pape
(74) *Attorney, Agent, or Firm* — Crowell & Moring LLP

(57) ABSTRACT

An assembly is provided consisting of a frame element of a motor vehicle and a connecting element used for connecting a part. The connecting element is secured to the frame element by way of a fiber winding.

20 Claims, 7 Drawing Sheets

(51) Int. Cl.
*B29C 65/00* (2006.01)
*B62D 29/04* (2006.01)
*B29C 70/84* (2006.01)
B29C 65/48 (2006.01)
B29L 31/30 (2006.01)
B29K 105/08 (2006.01)

(52) U.S. Cl.
CPC .... *B29C 66/1284* (2013.01); *B29C 66/12821* (2013.01); *B29C 66/532* (2013.01); *B29C 66/721* (2013.01); *B29C 70/845* (2013.01); *B62D 21/11* (2013.01); *B62D 29/048* (2013.01); B29C 65/48 (2013.01); B29C 66/112 (2013.01); B29C 66/12822 (2013.01); B29C 66/12842 (2013.01); B29K 2105/0872 (2013.01); B29L 2031/30 (2013.01); B60G 2204/143 (2013.01); B60G 2204/41 (2013.01); B60G 2204/4302 (2013.01); B60G 2206/60 (2013.01); B60G 2206/7101 (2013.01); B60G 2206/7102 (2013.01); B60G 2206/821 (2013.01)

(58) Field of Classification Search
CPC ... B29C 66/532; B29C 66/721; B29C 70/845; B62D 21/11; B62D 29/048; F16F 1/373
USPC .............................................. 296/29, 203.01
See application file for complete search history.

(56) References Cited

U.S. PATENT DOCUMENTS

| 2005/0029770 | A1 | 2/2005 | Kim |
| 2011/0123259 | A1 | 5/2011 | Brunneke et al. |
| 2011/0232851 | A1* | 9/2011 | Uehara ................. B60J 7/0015 160/317 |
| 2013/0334841 | A1 | 12/2013 | Heise et al. |
| 2014/0232143 | A1 | 8/2014 | Renner et al. |
| 2015/0108627 | A1* | 4/2015 | Shimanuki ............ H01L 21/565 257/690 |
| 2015/0166105 | A1 | 6/2015 | Zander et al. |

FOREIGN PATENT DOCUMENTS

| CN | 202055599 U | 11/2011 |
| DE | 40 40 459 A1 | 6/1992 |
| DE | 197 13 043 A1 | 1/1998 |
| DE | 10 2010 053 850 A1 | 6/2012 |
| DE | 10 2011 085 383 A1 | 5/2013 |
| EP | 0 032 051 A2 | 7/1981 |
| EP | 0 155 088 A1 | 9/1985 |
| EP | 0 637 520 A2 | 2/1995 |
| EP | 2 527 231 A2 | 11/2012 |
| EP | 2 628 614 A1 | 8/2013 |
| FR | 2 678 883 A1 | 1/1993 |
| GB | 2 316 373 A | 2/1998 |
| JP | 2009-107505 A | 5/2009 |
| WO | WO 01/64570 A1 | 9/2001 |
| WO | WO 2010/000257 A1 | 1/2010 |
| WO | WO 2011/035860 A1 | 3/2011 |
| WO | WO 2013/160208 A1 | 10/2013 |
| WO | WO 2014/029539 A1 | 2/2014 |
| WO | WO 2014/029541 A1 | 2/2014 |

OTHER PUBLICATIONS

Chinese Office Action issued in counterpart Chinese Application No. 201480057400.4 dated Feb. 17, 2017 with English-language translation (twelve (12) pages).
International Search Report (PCT/ISA/210) issued in PCT Application No. PCT/EP2014/076256, dated Jun. 23, 2015, with English translation (six (6) pages).
German-language Written Opinion (PCT/ISA/237) issued in PCT Application No. PCT/EP2014/076256, dated Jun. 23, 2015 (Six (6) pages).
German-language Search Report issued in counterpart German Application No. 10 2013 225 905.0 dated Mar. 20, 2014, with partial English translation(ten (10) pages).

\* cited by examiner

ASSEMBLY COMPRISING A FRAME ELEMENT AND A CONNECTING ELEMENT, AND METHOD FOR SECURING A CONNECTING ELEMENT TO A FRAME ELEMENT

CROSS REFERENCE TO RELATED APPLICATIONS

This application is a continuation of PCT International Application No. PCT/EP2014/076256, filed Dec. 2, 2014, which claims priority under 35 U.S.C. § 119 from German Patent Application No. 10 2013 225 905.0, filed Dec. 13, 2013, the entire disclosures of which are herein expressly incorporated by reference.

This application contains subject matter related to U.S. application Ser. No. 15/178,687, entitled "Support Structure in Framework Construction, and Method for Producing Same", and U.S. application Ser. No. 15/178,710, entitled "Assembly Consisting of a Frame Element, a Connecting Element and a Part Secured to the Connecting Element" both filed on Jun. 10, 2016.

BACKGROUND AND SUMMARY OF THE INVENTION

The invention relates to an assembly comprising a frame element of a motor vehicle and a connecting element, which is provided for attaching a component, and to a method for securing the connecting element to the frame element.

In the production of motor vehicles in the automotive industry, various parts of the motor vehicle are made from appropriate frame structures. Such frame structures include, for example, the chassis of most motor vehicles.

FIG. 5 shows part of a chassis provided for a motor vehicle, or of an appropriate frame structure. The frame structure has formed on it an attachment location ST1, which has two parallel attachment portions, each with a through-opening. A control arm of a wheel-suspension is secured at the attachment location ST1 via a screw connection running through the through-openings.

The frame structure shown in FIG. 5 is a metal structure made from individual frame elements ST2, ST3, etc. The attachment location ST1 is secured to the frame element ST2, for example, by a weld connection. While the vehicle is in operation, forces are introduced via the attachment location ST2 into the frame structure shown in FIG. 5.

Nowadays, for reasons relating to saving weight in the automotive industry, there is a tendency for such frame structures, in particular also in the chassis region, to be produced from fiber-reinforced plastics. In the case of such frame structures produced from fiber-reinforced plastics, the attachment locations are secured to the appropriate frame element by either adhesive-bonding connections and/or screw connections.

For the screw connections, it is necessary to provide appropriate through-openings in the frame element formed from a fiber-reinforced plastic, this resulting in the severing of fibers and thus in the fiber-reinforced plastic being weakened. The corresponding regions of the frame element therefore have to be designed using stronger/thicker materials or have to be reinforced by additional elements.

In the case of the alternative option of securing the attachment location via an adhesive, in contrast, it is necessary to provide large surface areas connected via the adhesive, so that the adhesive-bonding connection does not rupture under the action of intended forces.

Against this background, it is an object of the invention to provide an attachment location or an assembly comprising a frame element of a motor vehicle and a connecting element, provided for attaching a component, which has good stability properties and can be designed straightforwardly.

This object is achieved by an assembly and a method according to embodiments of the invention.

According to the present invention, an assembly comprising a frame element of a motor vehicle, for example a frame element of a chassis of a motor vehicle, and a connecting element, which is provided for attaching a component, for example a control arm belonging to a wheel-suspension, is designed in that the connecting element is secured to the frame element by a fiber winding.

The design of the fiber winding means that there is no need to provide through-passages for screw connections in the frame element, for which reason it is therefore also the case that there is no material weakening of the frame element.

In dependence on the intended force applied to the connecting element, or on the intended force to be introduced into the frame element, and the resulting flow of forces, the fiber winding may be formed in that a fiber is wound around the frame element and the connecting element such that appropriate portions of the fiber run parallel to one another or in a crossed state in the direction of the resulting flow of forces.

It is therefore possible to create, for different force flow-paths, fiber windings which ensure good securing of the connecting element to the frame element and thus a good introduction of forces.

The material of the fiber forming the fiber winding may be, for example, a carbon fiber, a glass fiber, an aramid fiber, a ceramic fiber, a boron fiber, a basalt fiber or a steel fiber.

The fiber winding or the corresponding fiber may be embedded in a matrix. This matrix may be, for example, a duroplast or a thermoplastic. Examples of duroplasts are epoxy resin, unsaturated polyester resin, vinylester resin, phenol formaldehyde resin, diallyl phthalate resin, methacrylate resin, polyurethane, amino resins, melamine resin, urea resin. Examples of thermoplastics are acrylonitrile butadiene styrene, polyamides, polylactate, polymethyl methacrylate, polycarbonate, polyethylene terephthalate, polyethylene, polypropylene, polystyrene, polyether ether ketone, polyvinyl chloride, polyphenylene sulfide, polysulfone, polyetherimide and polytetrafluoroethylene.

The fiber winding may be formed from an individual fiber of a certain length or from a plurality of such individual fibers. This means that, for example, one fiber is wound in one direction around the connecting element and the frame element and a further fiber is wound in the same direction or in a different direction, once again, around the connecting element and the frame element. The various fibers forming the fiber winding may be formed from the same or different materials mentioned above.

The connecting element is intended to attach a component, for example a control arm of a wheel-suspension system, to the frame element. For this purpose, the connecting element may have, for example, through-openings for a screw connection.

The material of the connecting element may be a fiber-reinforced plastic in which a reinforcing fiber or reinforcing fibers is or are embedded in a matrix made of a duroplast or a thermoplastic. In respect of examples of suitable duroplasts and thermoplastics, reference is made to the duroplasts and thermoplastics already mentioned. The embedded reinforcing fiber(s) may be of different lengths, i.e. short, long or endless. Short fibers have a length ranging from 0.1 to 1 mm, long fibers have a length ranging from 1 to 50 mm and endless fibers have a length>50 mm.

Should the connecting element be formed from metal, it is preferably a milled, cast or welded structure.

In particular, preferably at least edges along which the fiber winding runs are rounded and/or deburred, so that there is no risk of the fiber being damaged.

The frame element may be formed from a metal or a plastic, for example from a fiber-reinforced plastic.

In a preferred configuration of the assembly according to the invention, the frame element extends in a longitudinal direction, the connecting element has an attachment portion, which extends transversely to the longitudinal direction and is intended for attaching the component, and the fiber winding is configured such that it runs around the attachment portion.

In general, the fiber winding may be produced such that the fiber forming the fiber winding runs perpendicularly to the longitudinal direction. If the fiber winding is made from a plurality of individual fibers, it is also possible for the individual fibers to cross over one another. This means that the fiber(s) can form geodetic lines which connect points which, as seen in relation to the longitudinal direction, are located at the same level or are offset in relation to one another.

This configuration is advantageous in particular when tensile and compressive forces occur in the direction transverse to the longitudinal direction, in which the attachment portion extends, said forces being introduced via the attachment portion or the connecting element into the frame element.

In a preferred configuration of the assembly according to the invention, the connecting element has an outer surface, on which the fiber winding runs, wherein the connecting element is configured such that the outer surface of the connecting element is flush with an outer surface of the frame element.

In general, the connecting element and the frame element are adapted to one another such that there is a form fit between them. This ensures that, when an intended force is applied to the connecting element or when an intended force is introduced into the frame element, the connecting element does not rotate in relation to the frame element.

It is possible, for example, for the frame element to have a cross section which runs transversely to the longitudinal direction and is circular-arc-shaped, on the one hand, and linear, on the other hand. This means that, in this region, the frame element has, on the one hand, a planar surface-area portion and also an adjoining circular-arc-shaped surface-area portion. The connecting element is brought into abutment, in particular against the planar surface-area portion of the frame element, such that the outer surface of the connecting element, on which the fiber winding runs, is flush with the circular-arc-shaped portion of the frame element. As a result, there is a continuous transition between the outer surface of the connecting element and the outer surface of the frame element, and the fiber winding therefore does not run over any angular-edge transitions between the connecting element and the frame element.

Furthermore, the connecting element is preferably configured such that it has rounded or deburred edges, so that damage to the fiber winding by the edges of the connecting element is avoided.

In a preferred configuration of the assembly according to the invention, the attachment portion is formed from a first sub-element and a second sub-element, which are assembled so as to enclose the frame element between them. The fiber winding runs around the first and the second sub-elements.

The first sub-element and the second sub-element are preferably configured such that, in the assembled state, they form a joint continuous outer surface. This configuration ensures that the fiber of the fiber winding has a rectilinear progression and does not butt against any sharp edges. In addition, the appropriate edges of the first and second sub-elements may be rounded, so that damage to the fiber winding in the region in which the first and the second sub-elements are assembled is avoided.

In a preferred configuration of the assembly according to the invention, the frame element extends in a longitudinal direction, wherein the connecting element has a bearing portion, which is adapted to an outer surface of the frame element and from which an attachment portion, for attaching the component, extends transversely to the longitudinal direction. The fiber winding is preferably configured such that it runs around the bearing portion and/or the attachment portion. This preferred configuration allows the assembly according to the invention to be adapted to good effect to different requirements relating to force absorption and introduction of forces into the frame element.

If, for example, the attachment portion, running transversely to the longitudinal direction, is provided for attaching a control arm of a wheel-suspension system, it is possible for a fiber winding running around the bearing portion to absorb to better effect, and introduce into the frame element, forces which act in the longitudinal direction.

In a further preferred configuration of the assembly according to the invention, the attachment portion extends from a longitudinally directed end portion of the bearing portion. In this case, the fiber winding may be configured such that it runs around the bearing portion and/or the attachment portion.

In a further preferred configuration of the assembly according to the invention, the bearing portion is formed from a first sub-element and a second sub-element, which are assembled so as to enclose the frame element between them. In this case, the fiber winding is configured such that it runs around the first and second sub-elements of the bearing portion and/or the attachment portion.

This two-part configuration of the bearing portion ensures that the fiber forming the fiber winding has a continuous progression and does not butt against any possible sharp edges. The edges over which the fiber winding has to run may be additionally rounded/deburred.

In a further preferred configuration of the assembly according to the invention, the connecting element includes at least two attachment portions. The attachment portions here may be two separate, independent parts, preferably each extending from a bearing portion, or may be designed in the form of a single part, for example by the two attachment portions extending from a joint bearing portion.

In this case, the fiber winding can run over the bearing portion and/or over the attachment portions.

As already explained, the fiber winding may be produced such that the fiber forming the fiber winding runs perpendicularly to the longitudinal direction. If the fiber winding is made from a plurality of individual fibers, it is also possible for the individual fibers to cross over one another. This means that the fiber(s) can form geodetic lines which connect points which, as seen in relation to the longitudinal direction, are located at the same level or are offset in relation to one another.

The frame element and the connecting element are preferably formed from a fiber-reinforced plastic, the fiber winding being a fiber winding formed from a plastic fiber.

This material-specific configuration of the appropriate elements of the assembly according to the invention means that no corrosion occurs and, furthermore, the frame element, the connecting element and the fiber winding may be configured such that they have the same, or similar, coefficients of thermal expansion.

In a further preferred configuration of the assembly according to the invention, in a region on which the fiber winding runs, the connecting element has a concave surface on which to position the fiber winding.

This concave surface may be constituted, for example, by grooves in which to position the fiber making up the fiber winding. This configuration ensures that slipping of the fiber winding or of individual fiber portions is prevented.

The fiber winding of the assembly according to the invention may be formed from an individual winding or from a plurality of spatially separate sub-windings. It is possible here for the winding or each sub-winding to have a certain number of windings, wherein the number of windings is to be understood to mean how often the fiber(s) forming the winding/sub-winding have been wound around the frame element and the connecting element.

It should again be mentioned here that the fiber winding may be produced such that the fiber forming the winding/sub-winding runs perpendicularly to the longitudinal direction. If the winding/sub-winding is made from a plurality of individual fibers, it is also possible for the individual fibers to cross over one another. This means that the fiber(s) can form geodetic lines which connect points which, as seen in relation to the longitudinal direction, are located at the same level or are offset in relation to one another.

In a further preferred configuration of the assembly according to the invention, in addition to the fiber winding, an integral material bond is formed between the frame element and the connecting element.

Such an integral material bond may be established, for example, via an adhesive. The combination of the fiber winding and the integral material bond means that the assembly according to the invention can be formed to good effect to different requirements relating to introduction of forces into the frame structure. For example, the integral material bond, via the adhesive, absorbs shear stress and the connection produced via the fiber winding absorbs tensile stress.

In a further preferred configuration of the assembly according to the invention, the integral material bond is formed by an adhesive between the frame element and the bearing portion and, at at least one end portion located in the longitudinal direction of the frame element, the bearing portion is designed such that a quantity of adhesive increases.

In other words, the bearing portion is designed such that, at the at least one end portion located in the longitudinal direction of the frame element, it is beveled or stepped so as to increase the gap, between the frame element and bearing portion, in which the adhesive is located. This preferred configuration gives rise to a weakening/reduction in peak stressing, in particular peak stressing resulting from notch effects, occurring at the end portion.

The adhesive may be constituted, for example, by cold- or hot-setting adhesives, soft elastomers or hard adhesives. The gap located between the frame element and the bearing portion may have an order of magnitude of up to 3 mm.

It is also preferable for a projecting bead consisting of adhesive to be formed at the at least one longitudinally directed end portion. This likewise results in the reduction of peak stressing.

The present invention likewise provides a method by which a connecting element provided for attaching a component is secured to a frame element of a motor vehicle. The method includes providing the frame element and the connecting element, wherein the connecting element is secured to the frame element via a fiber winding.

The fiber winding is preferably formed such that, in dependence on the action of intended forces, it runs in the direction of the flow of forces.

The fiber winding can be formed by virtue of a single fiber or a plurality of fibers being wound. The fiber here is wound such that fiber portions run parallel or in a crossed state. In general, the fiber is preferably wound in the direction of the flow of forces.

The fiber winding may have a matrix which is formed from a matrix material and in which the corresponding fiber forming the fiber winding is embedded. The matrix can be produced in that, in a state in which it is impregnated in the matrix material, the fiber forming the fiber winding is wound to secure the connecting element to the frame element, or else the matrix material is applied to the fiber winding following completion of the winding operation.

In a preferred configuration of the method according to the invention, the frame element extends in a longitudinal direction, and the connecting element has an attachment portion, which is intended for attaching the component. Following the securing operation, the attachment portion extends, as intended, transversely to the longitudinal direction, and is provided, for example, for attaching a control arm of a wheel-suspension. The connecting element is secured to the frame element by the fiber winding, a fiber being wound around the attachment portion.

In a further preferred configuration of the method according to the invention, the frame element extends in a longitudinal direction, and the connecting element has a bearing portion, which is adapted to an outer surface of the frame element and from which an attachment portion, for attaching the component, extends transversely to the longitudinal direction. The connecting element is secured to the frame element by the fiber winding, a fiber being wound around the bearing portion and/or the attachment portion.

In general, the fiber winding may be produced such that the fiber forming the fiber winding runs perpendicularly to the longitudinal direction. If the fiber winding is made from a plurality of individual fibers, it is also possible for the individual fibers to cross over one another. This means that the fiber(s) can form geodetic lines which connect points which, as seen in relation to the longitudinal direction, are located at the same level or are offset in relation to one another.

In a further preferred configuration of the method according to the invention, the fiber, for securing the connecting element to the frame element, is wound such that portions of the fiber run parallel to one another or cross over one another.

In a further preferred configuration of the method according to the invention, the fiber is wound in a direction other than a direction in which the attachment portion extends.

In a further preferred configuration of the method according to the invention, the frame element is designed such that it extends in a longitudinal direction and has an abutment surface, on which the connecting element is brought into abutment with a bearing surface, which corresponds to the abutment surface, an integral material bond is established between the abutment surface and the bearing surface, and the fiber winding is formed such that it compresses the integral material bond.

In a further preferred configuration of the method according to the invention, the integral material bond is formed by an adhesive between the abutment surface and the bearing surface such that there is an increase in the quantity of adhesive at at least one longitudinally directed end portion of the connecting element.

Other objects, advantages and novel features of the present invention will become apparent from the following detailed description of one or more preferred embodiments when considered in conjunction with the accompanying drawings.

DETAILED DESCRIPTION OF THE DRAWINGS

In respect of those embodiments of the assembly according to the invention which will be presented hereinbelow, it should be mentioned here that the explanations given previously for the materials, the fiber winding and the integral material bond between the connecting element and frame element likewise apply to the embodiments.

Figure 1:
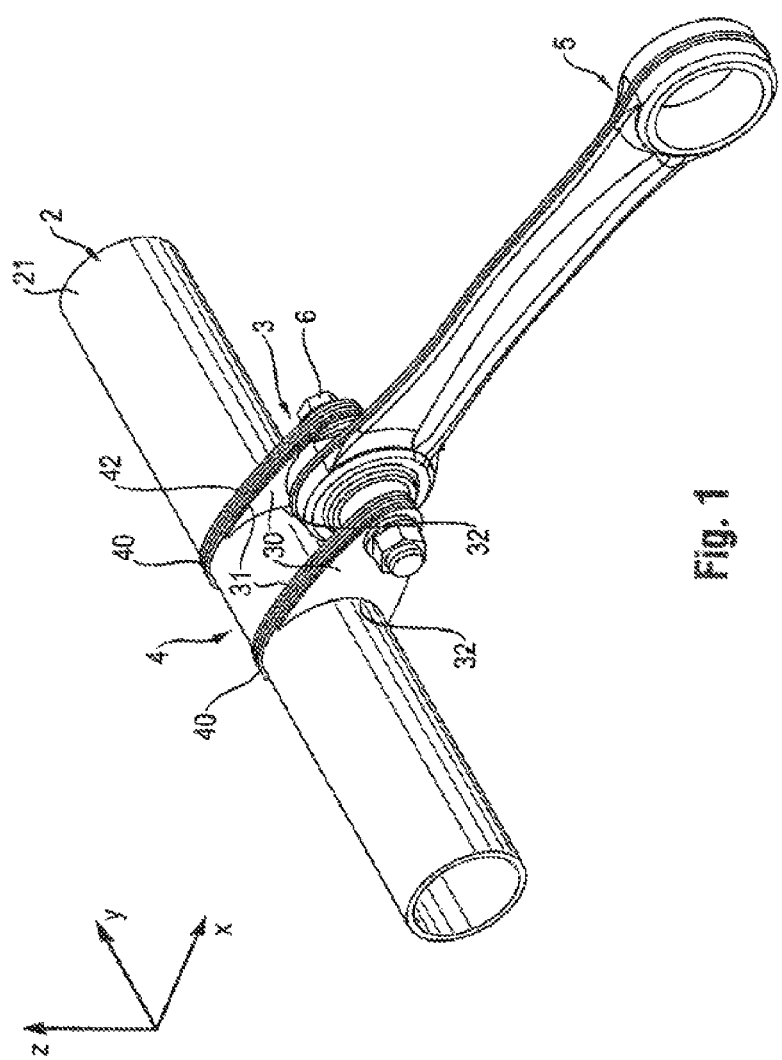
FIG. 1 shows a first preferred embodiment of an assembly according to the invention comprising a frame element of a motor vehicle and a connecting element, which is provided for attaching a component, wherein the connecting element is secured to the frame element via a fiber winding.

FIG. 1 shows a first preferred embodiment of an assembly 1 according to the invention.

The assembly 1 according to the invention includes a frame element 2, which belongs to a frame structure of a motor vehicle, for example a chassis of a motor vehicle, and a connecting element 3, which is secured to the frame element 2.

A control arm 5, which belongs for example to a wheel-suspension system, is fitted on the connecting element 3 by use of a screw connection 6. When a motor vehicle is in operation, forces are introduced via the control arm 5 into the frame structure or into the frame element 2.

The frame element 2 extends in the Y direction, which is shown in FIG. 1 and at the same time corresponds to the longitudinal direction of the frame element 2.

In the embodiment shown in FIG. 1, the connecting element 3 includes two attachment portions 30, which extend in the X direction, which is shown in FIG. 1. The X direction runs transversely or perpendicularly to the longitudinal direction or Y direction.

The control arm 5 is secured in a rotatably mounted manner to the attachment portions 30 by way of the screw connection 6. The control arm 5, like the attachment portions 30, extends in the direction transverse to the longitudinal direction, i.e. in the X direction, wherein tensile and compressive forces acting in the X direction, as intended, via the control arm 5 are introduced directly via the attachment portions 30 into the frame element 2.

In that embodiment of the assembly 1 according to the invention which is shown in FIG. 1, the attachment portions 30 are secured to the frame element 2 via a fiber winding 4, wherein the fiber winding 4 in FIG. 1 has two sub-windings 40, each securing one of the attachment portions 30 to the frame element 2.

In order to produce each of the sub-windings 40 of the fiber winding 4, a corresponding fiber is wound around the frame element 2 and the corresponding attachment portion 30 in the direction transverse to the longitudinal direction, i.e. in the X direction. The fiber forming the sub-winding 40 runs on an outer surface 31 of the corresponding attachment portion 30 and the outer surface 21 of the frame element 2. Each of the sub-windings 40 may be produced from an individual fiber wound a number of times around the attachment portion 30 and the frame element 2 or from a plurality of individual fibers each wound a number of times around the attachment portion 30 and the frame element 2.

In particular, a fiber forming the sub-winding 40 runs on the outer surface 21 of the frame element 2 and the outer surface 31 of the corresponding attachment portion 30 such that different portions 42 of the fiber run parallel to one another. In other words, portions 42 of the corresponding fiber which are located one beside the other after running once around the frame element 2 or the attachment portion 30 are located parallel to one another. This configuration of the fiber winding 4 allows in particular tensile forces acting in the positive X direction to be absorbed to good effect via the fiber winding 4 or the two sub-windings 40.

In the embodiment shown in FIG. 2, the attachment portions 30 butt against the outer surface 21 of the frame element 2 by way of a bearing surface 32, which is directed toward the frame element 2. The bearing surface 32 is configured such that it is adapted to the outer surface 21 of the frame element 2. More specifically this means, in the present embodiment, that the bearing surface 32, as seen from the y direction, is of circular-arc-shaped configuration and is thus adapted to the circular cross section (X-Z plane) of the frame element.

FIG. 2A once again illustrates the assembly 1 shown in FIG. 1, the screw connection 6 having been released, and the control arm 5 removed, in FIG. 2A. As a result, the through-openings 61 for the screw connection 6 can be seen in their entirety.

Figure 2A:
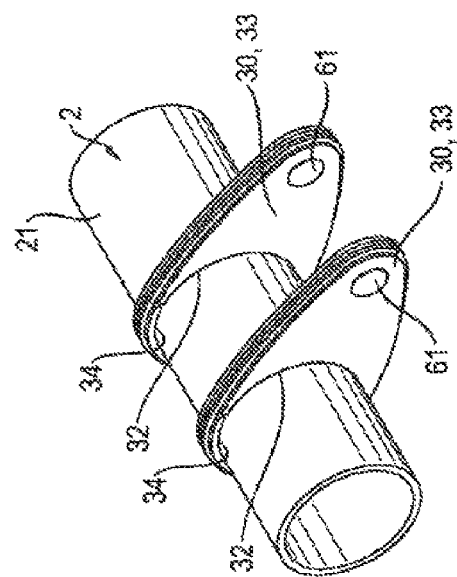
FIGS. 2A and 2B show the first preferred embodiment of the assembly according to the invention and a corresponding variant without an attached component.
Figure 2B:
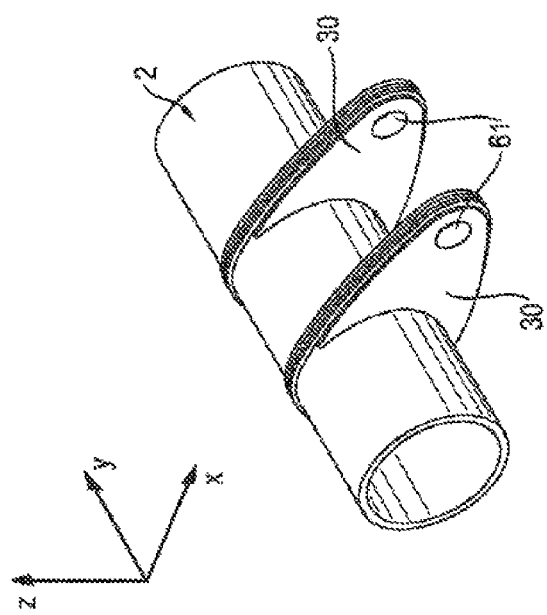

FIG. 2B illustrates a variant of the assembly 1 shown in FIG. 2A. The variant shown in FIG. 2B differs from that shown in FIG. 2A in that the attachment portions 30 are configured in a number of parts, in particular two parts, and extend all the way around the frame element 2 in each case. The attachment portions 30 each comprise a first sub-element 33, in which the through-opening 61 of the screw connection is located and which extends in the X direction, and a second sub-element 34, which supplements the first sub-element 33 such that the two sub-elements 33, 34 together enclose the frame element 2 between them. Therefore, each attachment portion 30, having the first and second sub-elements 33, 34, extends all the way around the frame element 2, with the exception of a gap located between the sub-elements. In this variant, the bearing surface 32 of each of the attachment portions 30 is thus formed by the first and second sub-elements 33, 34, wherein that part of the bearing surface 32 which belongs to the first sub-element 33, located in the X-Z plane, is semicircular and that part of the bearing surface 32 which belongs to the second sub-element 34, located in the X-Z plane, is likewise semicircular. This means that the sub-elements 33, 34 can be assembled such that they butt against the outer surface 21 of the frame element 2, and therefore the attachment portions 30 run all the way around the frame element 2 in each case.

As a result, in contrast to the case shown in FIG. 2A, the sub-windings 40 do not run over an edge at the transition between the corresponding attachment portion 30 and the frame element 2. For example this prevents the situation where the sub-winding 40 is damaged by the edge at the transition, shown in FIG. 2A, between the attachment portion 30 and the frame element 2.

Figure 2D:
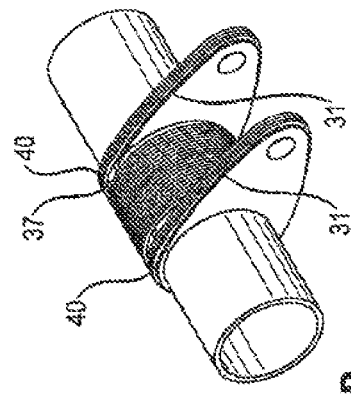
FIGS. 2C to 2F show a second preferred embodiment of the assembly according to the invention and corresponding variants without an attached component.
Figure 2F:
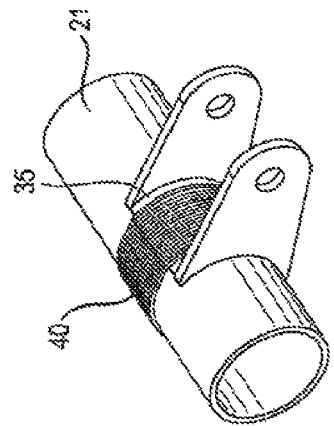
Figure 2C:
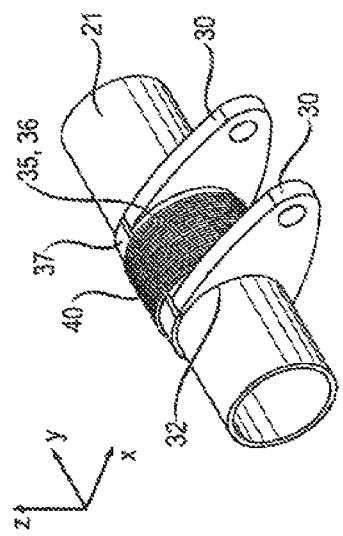

FIG. 2C shows a second embodiment of the assembly 1 according to the invention. In this second embodiment, the connecting element 3 includes a bearing portion 35, which is adapted to the outer surface 21 of the frame element 2. The bearing portion, in this embodiment, is made from a first sub-element 36 and a second sub-element 37, which together enclose the frame element 2 between them.

The attachment portions 30, which in this variant are not separate parts, extend from the first sub-element 36 of the bearing portion 35. In the case of the second embodiment shown in FIG. 2C, the attachment portions 30 are located at the longitudinally directed end portions, i.e. right at the outer periphery, of the first sub-element 36 of the bearing portion 35.

In this second embodiment, the bearing surface 32 is formed by that surface of the first and second sub-elements 36, 37 which is directed toward the frame element 2. That part of the bearing surface 32 which belongs to the first sub-element 36 is semicircular in the X-Z plane and that part of the bearing surface 32 which belongs to the second sub-element 37 is likewise semicircular in the X-Z plane. This means that the sub-elements 36, 37 can be assembled such that they butt against the outer surface 21 of the frame element 2 and the bearing portion 35 thus runs all the way around the frame element 2.

In this second embodiment, the fiber winding 4 runs between the attachment portions 30, over the bearing portion 35, i.e. the first and second sub-elements 36, 37 of the bearing portion 35. In this embodiment, the fiber winding is formed from a single winding 40, rather than a plurality of separate sub-windings. The winding 40 may be formed from one or more individual fibers.

As a result of this configuration of the connecting element 3, the winding 40 can have a larger number of windings, i.e. number of fiber revolutions, and can therefore be of thicker/stronger design. It is also possible, in this variant, for shear forces acting in the longitudinal direction to be absorbed, and introduced into the frame element 2, to better effect by the connecting element 3.

FIG. 2D shows a variant of the second embodiment of the assembly 1 according to the invention. The variant shown in FIG. 2D differs from that shown in FIG. 2C merely in that the fiber winding 4 has two further sub-windings 40, which run on the outer surfaces 31 of the attachment portions 30 and the outer surface of the second sub-element 37 of the bearing portion.

Figure 2E:
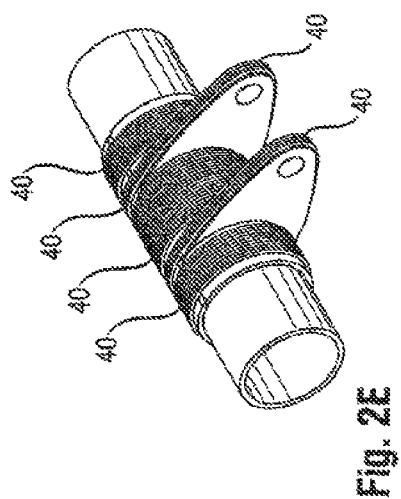

FIG. 2E shows a further variant of the second embodiment of the assembly 1 according to the invention. This variant differs from that shown in FIG. 2D in that the bearing portion 35 extends further in the longitudinal direction (positive and negative Y directions) in relation to the attachment portions 30. In other words, the dimensioning of the bearing portion 35 in the longitudinal direction is greater than that of the bearing portion in FIGS. 2C and 2D. Put another way, the attachment portions 30 are not located at the longitudinally directed end portions of the bearing portion 35.

In the variant shown in FIG. 2E, the fiber winding 4, in relation to the variant shown in FIG. 2D, has two further sub-windings 40, which are provided in the longitudinal direction on the outer end portions of the bearing portion 35.

FIG. 2F shows a further variant of the second embodiment of the assembly 1 according to the invention. This variant comprises a bearing portion 35, which is adapted to the outer surface 21 of the frame element and from which the attachment portions 30 extend at the longitudinally directed end portions. In this variant, the attachment portions 30 are of thinner design than those shown in FIGS. 2A to 2E.

Furthermore, the bearing portion 35 does not include a second sub-element. Consequently, the bearing portion 35 does not run all the way around the frame element. The fiber winding 4 has just one winding 40, which, in the variant shown in FIG. 2F, runs over the bearing portion 35 or between the attachment portions 30.

Figure 2G:
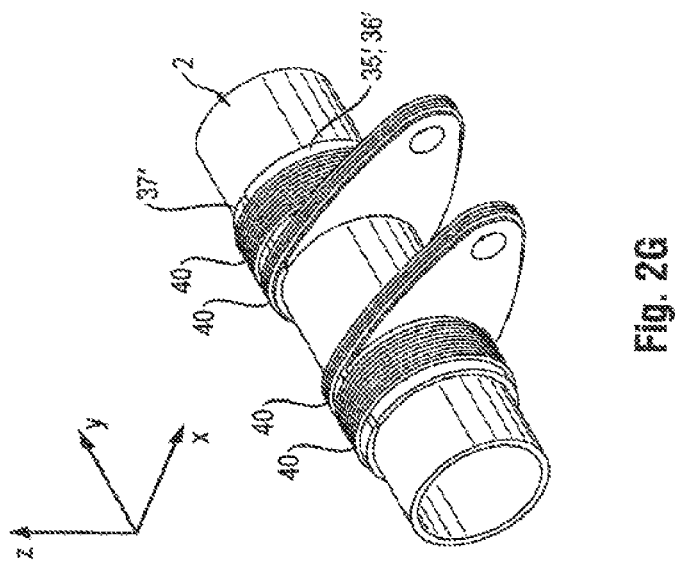
FIG. 2G shows a third preferred embodiment of the assembly according to the invention without an attached component.

FIG. 2G shows a third embodiment of the assembly according to the invention, wherein the third embodiment differs from that variant of the second embodiment which is shown in FIG. 2E in that that part of the bearing portion 35 which is located between the attachment portions 30 is not present. Put another way, in contrast to those variants of the second embodiment which are shown in FIGS. 2C to 2E, the attachment portions 30 are provided on a plurality of bearing portions 35', rather than jointly on a single bearing portion 35. Like the bearing portion 35 in FIGS. 2C to 2E, the bearing portions 35' comprise a first sub-element 36' and a second sub-element 37', which supplement one another such that the bearing portions 35' extend all the way around the frame element 2. In the case of the variant shown in FIG. 2G, the attachment portions 30 are formed on the mutually facing end portions of the bearing portions 35' shown. The bearing portions 35' extend in the longitudinal direction on the mutually remote sides of the attachment portions 30.

In this third embodiment of the assembly according to the invention, the fiber winding 4 includes four sub-windings 40, which run, on the one hand, around the bearing portions 35' and, on the other hand, over the outer surface of the attachment portions 30 and the outer surfaces of the second sub-elements 37' of the bearing portions 35'.

Figure 3:
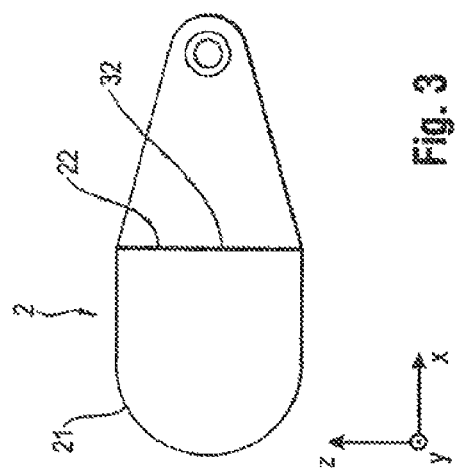
FIG. 3 shows a possible modification of the preferred embodiments of the assembly according to the invention, with a form fit between the frame element and the connecting element.

FIG. 3 shows a possible modification of the embodiments explained above. FIG. 3 corresponds to a view of the assembly as seen from the Y direction shown in FIG. 3, which extends perpendicularly to the plane of the drawing. To this extent, it is also the case that the frame element 2 in this figure runs perpendicularly to the plane of the drawing, the view shown in FIG. 3 corresponding to the X-Z plane. The modification can be applied to all of the embodiments, and variants, presented above and differs therefrom only in that the cross section of the frame element 2 is not completely circular. As shown in FIG. 3, the cross section of the frame element 2 has a circular-arc-shaped portion and a linear portion. This means that the frame element 2, at least at the location where the connecting element 3 is fastened, has a circular-arc-shaped surface 21, on which the fiber winding 4 also runs, and a planar abutment surface 22, against which the connecting element 3 butts by way of a planar bearing surface 32.

As can be seen from FIG. 3, this configuration of the assembly according to the invention establishes a form fit between the frame element and the connecting element. This form fit is advantageous, for example, to the extent where rotation of the connecting element 3 in relation to the frame element is prevented. It is possible here, via the assembly shown in FIG. 3, for a moment to be introduced to good effect into the frame element 2 or the corresponding frame structure.

It is possible for the assembly according to the invention, for securing purposes via the fiber winding, also to be secured to the frame element 2 by an additional integral material bond. This additional integral material bond will be described with reference to FIGS. 4A to 4D and can be used for all the embodiments and variants thereof.

Figure 4A:
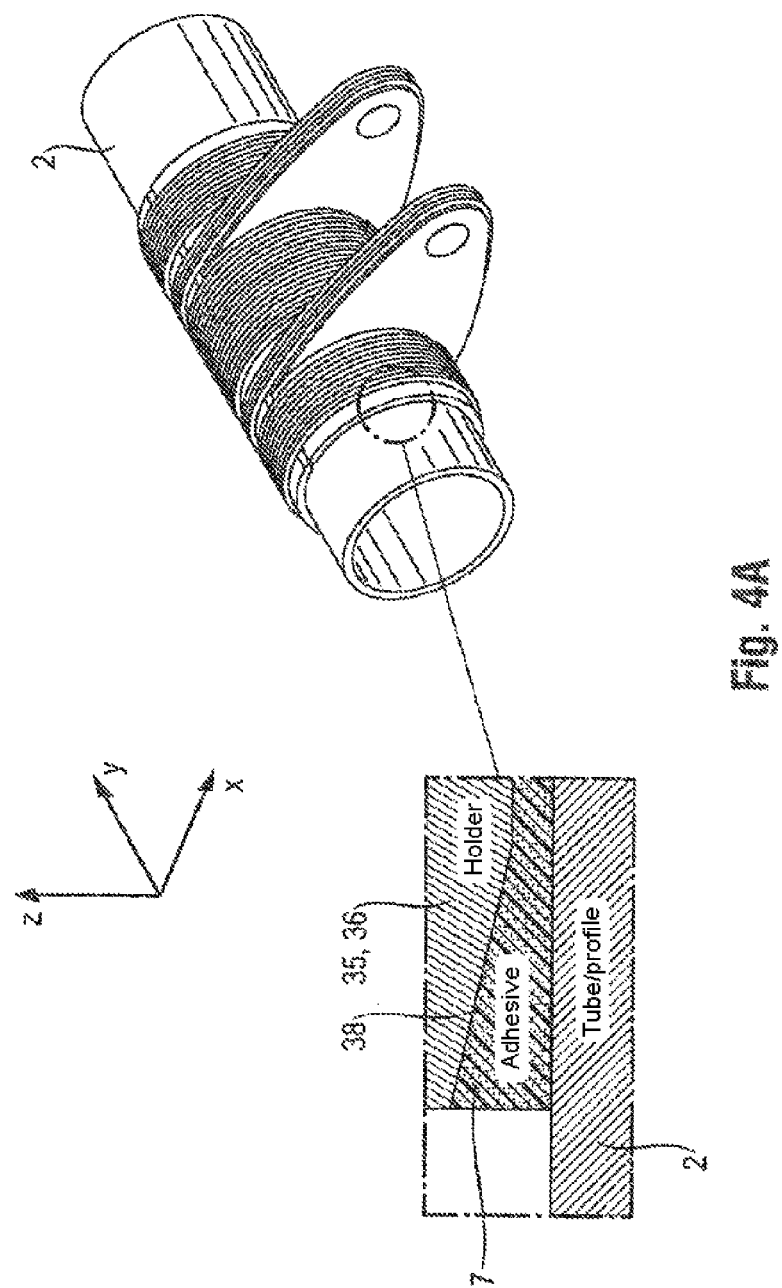
FIGS. 4A to 4D show that variant of the assembly according to the invention which is illustrated in FIG. 2E and also various configurations of a bearing portion of the connecting element for achieving an adhesive-bonding layer which increases in size.

FIG. 4A shows, for example, the assembly according to the invention shown in FIG. 2E, wherein the integral material bond illustrated hereinbelow, or the corresponding design of the bearing portion 35, can be applied to all the variants shown in FIGS. 2C to 2G and 3.

The integral material bond is established by an adhesive being introduced between the bearing portion 35 and the frame element 2. The bearing portion 35 is secured to the frame element 2 via the adhesive. The bearing portion is designed at the longitudinally directed end portions, as shown in FIG. 4A, such that a gap in which the adhesive is located increases in size at the end portions. As a result, there is an increase in the quantity of adhesive at the longitudinally directed end portions.

Figure 4B:
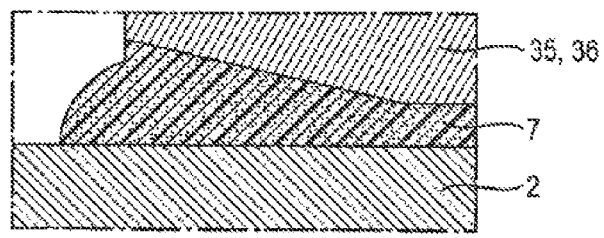
Figure 4C:
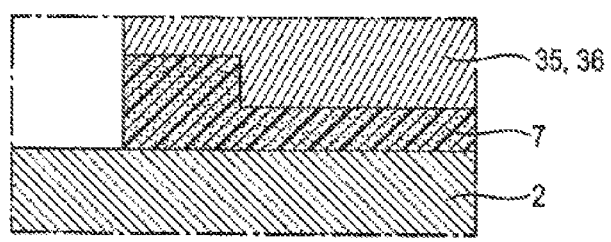
Figure 4D:
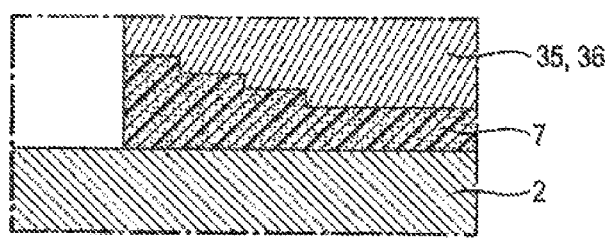
Figure 5:
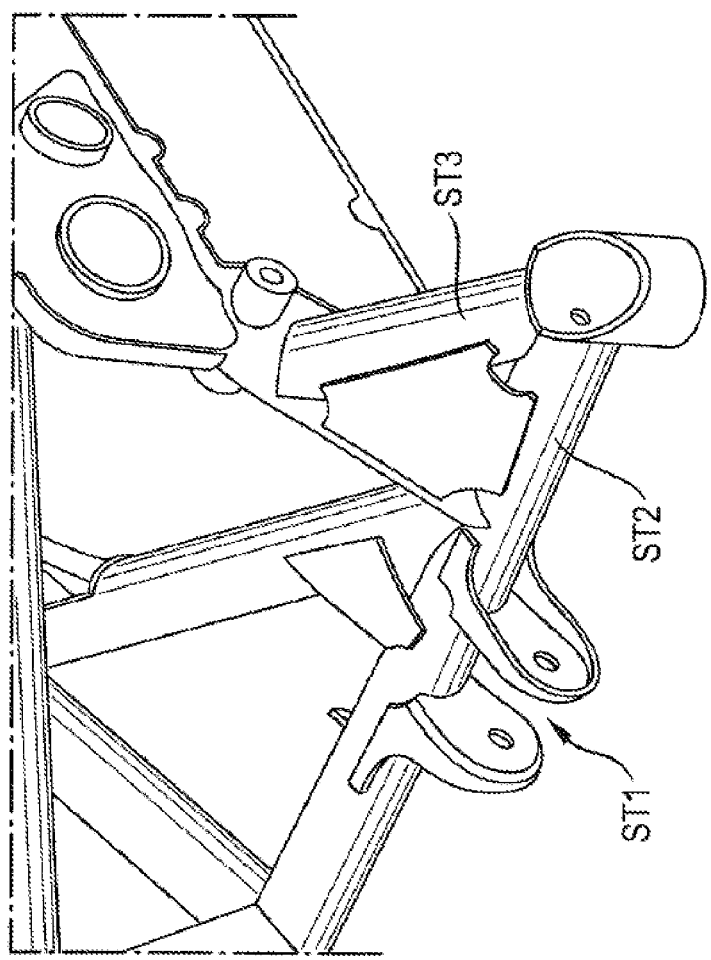
FIG. 5 shows a frame structure of a chassis provided for a motor vehicle, with an attachment location for attaching a control arm of a wheel-suspension to a frame element of the chassis.

FIGS. 4B to 4D show further variants of how it is possible to increase the quantity of adhesive at the longitudinally directed end portions of the bearing portion 35.

On the one hand, the quantity of adhesive between the bearing portion 35 and the frame element 2 may be large enough to give rise to a bead of adhesive at the end portion (see FIG. 4B).

On the other hand, it is possible, as shown in FIGS. 4A to 4D, for the bearing portion 35 to have a tapering or stepped peripheral region in the longitudinal direction, and therefore the quantity of adhesive increases at these peripheral regions. The increasing quantity of adhesive at the peripheral regions has the effect of lower peak stressing occurring, and the risk of the adhesive breaking off being reduced, at this location.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly, comprising:
 a frame element of a motor vehicle;
 a connecting element, provided for attaching a component, and
 a fiber winding configured to non-displaceably secure the connecting element to the frame element.

2. The assembly as claimed in claim 1, wherein:
 the frame element extends in a longitudinal direction,
 the connecting element has an attachment portion, which is configured for attaching the component and extends transversely to the longitudinal direction, and
 the fiber winding is configured such that it runs around the attachment portion.

3. The assembly as claimed in claim 2, wherein the connecting element has an outer surface, on which the fiber winding runs and which is configured such that the outer surface of the connecting element is flush with an outer surface of the frame element.

4. The assembly as claimed in claim 2, wherein:
 the attachment portion is formed from a first sub-element and a second sub-element, which are assembled so as to enclose the frame element, and
 the fiber winding is configured such that it runs around the first and second sub-elements of the attachment portion.

5. The assembly as claimed in claim 1, wherein:
 the frame element extends in a longitudinal direction,
 the connecting element has a bearing portion, which is adapted to an outer surface of the frame element and from which an attachment portion, for attaching the component, extends transversely to the longitudinal direction, and
 the fiber winding is configured such that it runs around the bearing portion and/or the attachment portion.

6. The assembly as claimed in claim 5, wherein:
 the attachment portion extends from a longitudinally directed end portion of the bearing portion, and
 the fiber winding is configured such that it runs around the bearing portion and/or the attachment portion.

7. The assembly as claimed in claim 5, wherein:
 the bearing portion is formed from a first sub-element and a second sub-element, which are assembled so as to enclose the frame element, and
 the fiber winding is configured such that it runs around the first and second sub-elements of the bearing portion and/or the attachment portion.

8. The assembly as claimed in claim 5, wherein the connecting element has at least two attachment portions.

9. The assembly as claimed in claim 1, wherein:
 the frame element and the connecting element are formed from a fiber-reinforced plastic, and
 the fiber winding is formed from a plastic fiber.

10. The assembly as claimed in claim 1 wherein, in a region on which the fiber winding is formed, the connecting element has concave portions in which to position fiber portions.

11. The assembly as claimed in claim 1, wherein, in addition to the fiber winding, an integral material bond is formed between the frame element and the connecting element.

12. The assembly as claimed in claim 5, wherein:
 an integral material bond is formed by an adhesive between the frame element and the bearing portion, and,
 at at least one end portion of the bearing portion extending in the longitudinal direction away from a longitudinal center of the connecting element, the bearing portion is designed such that a quantity of adhesive increases.

13. A method by which a connecting element provided for attaching a component is secured to a frame element of a motor vehicle, wherein the method comprises the acts of:
 providing the frame element and the connecting element; and
 securing the connecting element non-displaceably to the frame element via a fiber winding.

14. The method as claimed in claim 13, wherein:
the frame element extends in a longitudinal direction and the connecting element has an attachment portion, which is configured for attaching the component and, following the securing operation, extends transversely to the longitudinal direction, and
the connecting element is secured to the frame element by the fiber winding formed by a fiber being wound around the attachment portion.

15. The method as claimed in claim 13, wherein:
the frame element extends in a longitudinal direction,
the connecting element has a bearing portion, which is adapted to an outer surface of the frame element and from which an attachment portion, for attaching the component, extends transversely to the longitudinal direction, and
the connecting element is secured to the frame element by the fiber winding formed by a fiber being wound around the bearing portion and/or the attachment portion.

16. The method as claimed in claim 13, wherein the fiber winding is formed by a fiber, for securing the connecting element to the frame element, wound such that portions of the fiber run parallel to one another or cross over one another.

17. The method as claimed in claim 14, wherein the fiber is wound in a direction other than a direction in which the attachment portion extends.

18. The method as claimed in claim 15, wherein the fiber is wound in a direction other than a direction in which the attachment portion extends.

19. The method as claimed in claim 13, wherein:
the frame element is designed so as to extend in a longitudinal direction and have an abutment surface, on which the connecting element is brought into abutment with a bearing surface, which corresponds to the abutment surface,
an integral material bond is established between the abutment surface and the bearing surface, and
the fiber winding is formed such that the integral material bond is compressed.

20. The method as claimed in claim 19, wherein the integral material bond is formed by an adhesive between the abutment surface and the bearing surface such that there is an increase in a quantity of adhesive at at least one longitudinally directed end portion of the connecting element.

* * * * *